(12) United States Patent
Crompton et al.

(10) Patent No.: US 11,035,510 B1
(45) Date of Patent: Jun. 15, 2021

(54) ELECTRICAL CONDUIT FITTING AND ASSEMBLY

(71) Applicant: Quick Fitting, Inc., Warwick, RI (US)

(72) Inventors: David B. Crompton, Stonington, CT (US); Libardo Ochoa Dias, West Warwick, RI (US); Herbert J. Bouchard, West Greenwich, RI (US)

(73) Assignee: Quick Fitting Holding Company, LLC, Warwick, RI (US)

(*) Notice: Subject to any disclaimer, the term of this patent is extended or adjusted under 35 U.S.C. 154(b) by 0 days.

(21) Appl. No.: 16/778,448

(22) Filed: Jan. 31, 2020

(51) Int. Cl.
*F16L 37/091* (2006.01)
*H02G 3/04* (2006.01)

(52) U.S. Cl.
CPC ......... *F16L 37/0915* (2016.05); *F16L 37/091* (2013.01); *H02G 3/0481* (2013.01)

(58) Field of Classification Search
CPC ... F16L 37/091; F16L 37/0915; H02G 3/0481
USPC ........................................................ 285/340
See application file for complete search history.

(56) References Cited

U.S. PATENT DOCUMENTS

| 70,198 A | 10/1867 | Gray |
| 1,822,056 A | 9/1931 | Noble |
| 1,927,890 A | 9/1933 | Church |
| 2,132,636 A | 10/1938 | Maahs |
| 2,201,372 A | 5/1940 | Miller |
| 2,230,098 A | 1/1941 | Wurzburger |
| 2,316,806 A | 4/1943 | Parker |
| 2,398,618 A | 4/1946 | Chavayda |
| 2,450,527 A | 10/1948 | Smith et al. |
| 2,452,275 A | 10/1948 | Woodling |
| 2,456,203 A | 12/1948 | Loepsinger |
| 2,478,149 A | 8/1949 | Wolfram |
| 2,529,821 A | 11/1950 | Snider |
| 2,774,616 A | 12/1956 | Dodd et al. |
| 2,917,075 A | 12/1959 | Terry |
| 3,060,959 A | 10/1962 | Clark |
| 3,064,983 A | 11/1962 | Halterman |
| 3,066,961 A | 12/1962 | Jacques |
| 3,074,747 A | 1/1963 | Boughton |
| 3,140,107 A | 7/1964 | Hynes |
| 3,145,730 A | 8/1964 | Presnell |

(Continued)

FOREIGN PATENT DOCUMENTS

| CA | 2386574 | 3/2001 |
| CA | 2751965 C | 1/2019 |

(Continued)

OTHER PUBLICATIONS

International Search Report and Written Opinion, PCT/US20/16115, dated Apr. 14, 2020, United States Patent and Trademark Office.

*Primary Examiner* — Zachary T Dragicevich
(74) *Attorney, Agent, or Firm* — Williams Mullen; Thomas F. Bergert

(57) ABSTRACT

A push-to-connect electrical conduit fitting and assembly facilitates the connection of multiple types of metallic conduit. In various embodiments, an axially internal portion of the fitting has an interior surface that tapers from a narrower radius to a wider radius as it extends axially outwardly from a tube stop element. A packing arrangement including a fastening ring and release pusher are maintained within axially intermediate and/or outer portions of the fitting to facilitate retention of inserted conduits.

19 Claims, 7 Drawing Sheets

(56) References Cited

U.S. PATENT DOCUMENTS

| | | |
|---|---|---|
| 3,168,122 A | 6/1965 | Smith |
| 3,193,299 A | 7/1965 | Gardner |
| 3,265,412 A | 8/1966 | Reid et al. |
| 3,312,484 A | 4/1967 | Davenport |
| 3,365,219 A | 1/1968 | Nicolaus |
| 3,428,337 A | 2/1969 | Read |
| 3,434,745 A | 3/1969 | Jackman |
| 3,498,647 A | 3/1970 | Schroder |
| 3,632,141 A | 1/1972 | Larsson |
| 3,633,944 A | 1/1972 | Hamburg |
| 3,659,881 A | 5/1972 | Tinsley et al. |
| 3,679,241 A | 7/1972 | Hoffmann |
| 3,709,526 A | 1/1973 | Cromie |
| 3,805,824 A | 4/1974 | Robbins |
| 3,821,670 A | 6/1974 | Thompson |
| 3,837,687 A | 9/1974 | Leonard |
| 3,885,821 A | 5/1975 | Philibert |
| 3,915,480 A | 10/1975 | Kish et al. |
| 3,986,730 A | 10/1976 | Martelli et al. |
| 4,000,919 A | 1/1977 | Edwards et al. |
| 4,009,592 A | 3/1977 | Boerger |
| 4,037,864 A | 7/1977 | Anderson et al. |
| 4,067,361 A | 1/1978 | Holloster et al. |
| 4,083,586 A | 4/1978 | Helm |
| 4,107,452 A | 8/1978 | Razvi |
| 4,123,090 A | 10/1978 | Kotsakis et al. |
| 4,135,745 A | 1/1979 | Dehar |
| 4,146,254 A | 3/1979 | Turner et al. |
| 4,178,023 A | 12/1979 | Guest |
| 4,220,361 A | 9/1980 | Brandenberg |
| 4,275,909 A | 6/1981 | Yoshizawa et al. |
| 4,288,113 A | 9/1981 | Saulnier |
| 4,305,606 A | 12/1981 | Legris |
| 4,372,586 A | 2/1983 | Rosenberg |
| 4,372,905 A | 2/1983 | Bohman |
| 4,383,552 A | 5/1983 | Baker |
| 4,437,493 A | 3/1984 | Okuda et al. |
| 4,440,424 A | 4/1984 | Mode |
| 4,466,640 A | 8/1984 | Van Houtte |
| 4,480,729 A | 11/1984 | Porter |
| 4,497,511 A | 2/1985 | Barker |
| 4,508,369 A | 4/1985 | Mode |
| 4,591,192 A | 5/1986 | Van Excel et al. |
| 4,593,943 A | 6/1986 | Hama et al. |
| 4,606,565 A | 8/1986 | Royston |
| 4,613,172 A | 9/1986 | Schattmaier |
| 4,627,644 A | 12/1986 | Ekman |
| 4,630,848 A | 12/1986 | Twist |
| 4,637,636 A | 1/1987 | Guest |
| 4,637,640 A | 1/1987 | Fournier et al. |
| 4,645,246 A | 2/1987 | Guest |
| 4,685,706 A | 8/1987 | Kowal et al. |
| 4,712,810 A | 12/1987 | Pozzi |
| 4,747,626 A | 5/1988 | Hama et al. |
| 4,801,158 A | 1/1989 | Gomi |
| 4,802,696 A | 2/1989 | Chohan et al. |
| 4,867,198 A | 9/1989 | Faust |
| 4,878,697 A | 11/1989 | Henry |
| 4,880,260 A | 11/1989 | Gotoh et al. |
| 4,895,395 A | 1/1990 | Ceriani |
| 4,919,457 A | 4/1990 | Moretti |
| 4,997,214 A | 3/1991 | Reese |
| 5,010,740 A | 4/1991 | Backus et al. |
| 5,024,468 A | 6/1991 | Burge |
| 5,052,721 A | 10/1991 | Gorman |
| 5,084,954 A | 2/1992 | Klinger |
| 5,108,134 A | 4/1992 | Irwin |
| 5,160,179 A | 11/1992 | Takagi |
| 5,181,751 A | 1/1993 | Kitamura |
| 5,230,539 A | 7/1993 | Olson |
| 5,251,655 A | 10/1993 | Low |
| 5,284,582 A | 2/1994 | Yang |
| 5,292,157 A | 3/1994 | Rubichon |
| 5,370,423 A | 12/1994 | Guest |
| 5,425,347 A | 6/1995 | Zinke, II |
| 5,443,289 A | 8/1995 | Guest |
| 5,487,572 A | 1/1996 | Combot-Courrau et al. |
| 5,511,831 A | 4/1996 | Barton |
| 5,524,936 A | 6/1996 | Barr et al. |
| 5,577,530 A | 11/1996 | Condon |
| 5,588,681 A | 12/1996 | Parks |
| 5,603,532 A | 2/1997 | Guest |
| 5,711,550 A | 1/1998 | Brandt |
| 5,722,696 A | 3/1998 | Taneya |
| 5,769,462 A | 6/1998 | Angell |
| 5,887,911 A | 3/1999 | Kargula |
| 5,911,443 A | 6/1999 | Le Quere |
| 5,957,509 A | 9/1999 | Komolrochanaporn |
| 5,983,917 A | 11/1999 | Thomas |
| 5,988,690 A | 11/1999 | Bogard |
| 5,996,632 A | 12/1999 | Vogel et al. |
| 6,012,743 A | 1/2000 | Godeau |
| 6,145,887 A | 11/2000 | Cambot-Courrau |
| 6,145,893 A | 11/2000 | Kuo |
| 6,174,002 B1 | 1/2001 | Rho |
| 6,264,250 B1 | 7/2001 | Teraoka et al. |
| 6,343,814 B1 | 2/2002 | Bucher et al. |
| 6,352,439 B1 | 3/2002 | Stark et al. |
| 6,357,802 B1 | 3/2002 | Nozato et al. |
| 6,427,309 B1 | 8/2002 | Viegener |
| 6,447,109 B1 | 9/2002 | Williamson et al. |
| 6,502,866 B1 | 1/2003 | Hujisawa et al. |
| 6,517,124 B1 | 2/2003 | Le Quere |
| 6,536,470 B1 | 3/2003 | Carn et al. |
| 6,578,879 B1 | 6/2003 | Muto |
| 6,583,815 B1 | 6/2003 | Driscoll et al. |
| 6,612,623 B2 | 9/2003 | Salomon-Bahls |
| 6,634,074 B2 | 10/2003 | Wild |
| 6,685,230 B2 | 2/2004 | Bottura |
| 6,764,102 B2 | 7/2004 | Ezura |
| 6,795,113 B1 | 9/2004 | Jackson et al. |
| 6,805,385 B2 | 10/2004 | Viegener |
| 6,824,172 B1 | 11/2004 | Komolrochanaporn |
| 6,843,516 B2 | 1/2005 | Bishop et al. |
| 6,851,728 B2 | 2/2005 | Minami |
| 6,869,109 B2 | 3/2005 | Matsushita |
| 6,871,804 B2 | 3/2005 | Hagihara |
| 6,954,310 B2 | 10/2005 | Holloway et al. |
| 6,979,026 B2 | 12/2005 | Kasahara et al. |
| 6,988,509 B2 | 1/2006 | Frampton et al. |
| 6,988,746 B2 | 1/2006 | Olson |
| 7,025,392 B2 | 4/2006 | Inoue et al. |
| 7,100,948 B2 | 9/2006 | Guest |
| 7,178,836 B2 | 2/2007 | Hoff et al. |
| 7,195,287 B2 | 3/2007 | Wai |
| 7,273,235 B2 | 9/2007 | Coquard et al. |
| 7,316,429 B2 | 1/2008 | Viegener |
| 7,350,831 B2 | 4/2008 | Shimizu |
| 7,380,836 B2 | 6/2008 | Bogdanowicz et al. |
| 7,445,247 B2 | 11/2008 | Ericksen et al. |
| 7,448,654 B2 | 11/2008 | Le Quere |
| 7,475,913 B2 | 1/2009 | Muto |
| 7,509,971 B2 | 3/2009 | Kajuch |
| 7,530,606 B1 | 5/2009 | Yang |
| 7,549,679 B2 | 6/2009 | Brosius et al. |
| 7,621,569 B2 | 11/2009 | Anthoine |
| 7,644,955 B1 | 1/2010 | Komolrochanaporn |
| 7,646,404 B2 | 1/2010 | Liu et al. |
| 7,686,346 B1 | 3/2010 | Buccicone et al. |
| 7,823,932 B2 | 11/2010 | Webb et al. |
| 7,850,208 B2 | 12/2010 | Greenberger |
| 7,862,089 B2 | 1/2011 | Crompton |
| 7,878,555 B2 | 2/2011 | Oh |
| 7,914,050 B2 | 3/2011 | Udhofer et al. |
| 7,942,161 B2 | 5/2011 | Crompton |
| 7,954,861 B2 | 6/2011 | Swift et al. |
| 8,118,331 B2 | 2/2012 | Yamashita et al. |
| RE43,490 E | 6/2012 | Gullichsen et al. |
| 8,205,915 B1 | 6/2012 | Crompton et al. |
| 8,210,576 B2 | 7/2012 | Crompton |
| 8,272,871 B2 | 9/2012 | Becker et al. |
| 8,322,755 B2 | 12/2012 | Kluss et al. |
| 8,398,122 B2 | 3/2013 | Crompton et al. |
| 8,439,404 B2 | 5/2013 | Anton et al. |

(56) References Cited

U.S. PATENT DOCUMENTS

| | | |
|---|---|---|
| 8,480,134 B2 | 7/2013 | Crompton et al. |
| 8,487,197 B2 | 7/2013 | Smith |
| 8,491,012 B2 | 7/2013 | LeQuere |
| 8,517,431 B2 | 8/2013 | Arning et al. |
| 8,585,100 B2 | 11/2013 | Stults et al. |
| 8,701,715 B1 | 4/2014 | Crompton et al. |
| 8,730,299 B1 | 5/2014 | Kozko |
| 8,764,066 B1 | 7/2014 | Rice et al. |
| 8,818,101 B1 | 8/2014 | Lim |
| 8,844,974 B1 | 9/2014 | Crompton et al. |
| 8,844,981 B1 | 9/2014 | Crompton et al. |
| 8,888,145 B1 | 11/2014 | Crompton et al. |
| 9,055,220 B1 | 6/2015 | Kozko |
| 9,068,680 B1 | 6/2015 | Crompton et al. |
| 9,086,179 B1 | 7/2015 | Komolrochanaporn |
| 9,152,019 B2 | 10/2015 | Kintner |
| 9,217,529 B2 | 12/2015 | Crompton et al. |
| 9,416,897 B2 | 8/2016 | Crompton et al. |
| 9,521,321 B1 | 12/2016 | Kozko |
| 10,400,929 B2 | 9/2019 | Crompton et al. |
| 2002/0158466 A1* | 10/2002 | Jones ................ F16L 37/091 285/340 |
| 2002/0163195 A1 | 11/2002 | Vitel et al. |
| 2003/0020279 A1 | 1/2003 | Houtschilt et al. |
| 2003/0057701 A1 | 3/2003 | Koo |
| 2003/0067170 A1 | 4/2003 | Snyder et al. |
| 2003/0071460 A1 | 4/2003 | Synder et al. |
| 2004/0061787 A1 | 4/2004 | Liu et al. |
| 2004/0070195 A1 | 4/2004 | Rohrig |
| 2004/0239115 A1 | 12/2004 | Wilk et al. |
| 2004/0245766 A1 | 12/2004 | Vallee |
| 2004/0255608 A1 | 12/2004 | Hector et al. |
| 2005/0058360 A1 | 3/2005 | Berkey et al. |
| 2005/0194785 A1 | 9/2005 | Shemtov |
| 2005/0225087 A1 | 10/2005 | McMahon et al. |
| 2006/0056056 A1 | 3/2006 | Ahiska et al. |
| 2006/0163870 A1 | 7/2006 | Goilot |
| 2006/0202478 A1 | 9/2006 | Guest |
| 2007/0075542 A1* | 4/2007 | Glaze ................ F16L 37/0915 |
| 2007/0236595 A1 | 10/2007 | Pan et al. |
| 2008/0024594 A1 | 1/2008 | Ritchey |
| 2008/0143103 A1 | 6/2008 | Kiely |
| 2008/0309081 A1 | 12/2008 | De Wilde |
| 2009/0002797 A1 | 1/2009 | Kwong et al. |
| 2009/0021001 A1 | 1/2009 | Oh |
| 2009/0273130 A1 | 11/2009 | Armstrong et al. |
| 2009/0278346 A1 | 11/2009 | O'Brien |
| 2009/0278347 A1 | 11/2009 | Kerin et al. |
| 2010/0002071 A1 | 1/2010 | Ahiska |
| 2010/0033551 A1 | 2/2010 | Agarwala et al. |
| 2010/0045773 A1 | 2/2010 | Ritchey |
| 2010/0097442 A1 | 2/2010 | Lablans |
| 2010/0119172 A1 | 5/2010 | Yu et al. |
| 2010/0253064 A1 | 10/2010 | Le Quere |
| 2011/0002544 A1 | 1/2011 | Oshima |
| 2011/0032368 A1 | 2/2011 | Pelling |
| 2011/0049875 A1 | 3/2011 | Stults et al. |
| 2011/0101685 A1 | 5/2011 | Lai |
| 2011/0211040 A1 | 9/2011 | Lindemann et al. |
| 2012/0001414 A1 | 1/2012 | Arning et al. |
| 2012/0044391 A1 | 2/2012 | Ni et al. |
| 2012/0169039 A1 | 7/2012 | Crompton et al. |
| 2012/0169842 A1 | 7/2012 | Chuang et al. |
| 2012/0200081 A1 | 8/2012 | Reznar et al. |
| 2012/0242788 A1 | 9/2012 | Chuang et al. |
| 2012/0257008 A1 | 10/2012 | Taylor |
| 2012/0273709 A1 | 11/2012 | Zhang |
| 2012/0284994 A1 | 11/2012 | Crompton et al. |
| 2013/0168959 A1 | 7/2013 | Turk |
| 2013/0241198 A1 | 9/2013 | Eaton et al. |
| 2013/0258044 A1 | 10/2013 | Betts-Lacroix |
| 2013/0278715 A1 | 10/2013 | Nutsch et al. |
| 2013/0321569 A1 | 12/2013 | Agarwala et al. |
| 2013/0329002 A1 | 12/2013 | Tico |
| 2014/0002588 A1 | 1/2014 | Ahiska |
| 2014/0021717 A1 | 1/2014 | Burke et al. |
| 2014/0049609 A1 | 2/2014 | Wilson et al. |
| 2014/0062078 A1 | 3/2014 | Weissmann |
| 2014/0210940 A1 | 7/2014 | Barnes |
| 2014/0265321 A1 | 9/2014 | DeCesare et al. |
| 2014/0267586 A1 | 9/2014 | Aguilar et al. |
| 2014/0267596 A1 | 9/2014 | Geerds |
| 2014/0313377 A1 | 10/2014 | Hampton |
| 2015/0103197 A1 | 4/2015 | Djordjevic et al. |
| 2015/0137515 A1 | 5/2015 | Ratschmann et al. |
| 2015/0155654 A1 | 6/2015 | Ferry |
| 2015/0189140 A1 | 7/2015 | Sutton et al. |
| 2015/0212653 A1 | 7/2015 | Cable et al. |
| 2015/0244930 A1 | 8/2015 | Ettinger et al. |
| 2015/0323112 A1 | 11/2015 | Wright |
| 2015/0345663 A1 | 12/2015 | Jiang et al. |
| 2015/0345683 A1 | 12/2015 | Crompton et al. |
| 2015/0358539 A1 | 12/2015 | Catt |
| 2015/0373279 A1 | 12/2015 | Osborne et al. |
| 2016/0018030 A1 | 1/2016 | Arstein et al. |
| 2016/0073104 A1 | 3/2016 | Hillebrand et al. |
| 2016/0088280 A1 | 3/2016 | Sadi et al. |
| 2016/0131289 A1 | 5/2016 | Spears et al. |
| 2016/0161038 A1 | 6/2016 | Crompton et al. |
| 2016/0198087 A1 | 7/2016 | Georgiev et al. |
| 2016/0219217 A1 | 7/2016 | Williams et al. |
| 2016/0290538 A1 | 10/2016 | Kawanishi |
| 2016/0360104 A1 | 12/2016 | Zhang et al. |
| 2017/0126971 A1 | 5/2017 | Evans et al. |
| 2017/0163889 A1 | 6/2017 | Evans et al. |
| 2018/0031156 A1 | 2/2018 | Crompton et al. |
| 2019/0067922 A1 | 2/2019 | Platt et al. |
| 2019/0093807 A1* | 3/2019 | Crompton ........... F16L 37/0915 |

FOREIGN PATENT DOCUMENTS

| | | |
|---|---|---|
| CN | 104154363 | 11/2014 |
| DE | 4304241 | 8/1994 |
| EP | 0272988 | 6/1988 |
| EP | 0610538 | 8/1994 |
| EP | 1004805 | 5/2000 |
| EP | 1521027 | 4/2005 |
| EP | 1564473 | 8/2005 |
| EP | 2133612 | 12/2009 |
| EP | 2256394 | 12/2010 |
| EP | 2511583 | 10/2012 |
| GB | 2146400 | 4/1985 |
| GB | 2328259 | 8/2002 |
| JP | 2001032984 | 2/2001 |
| WO | 1999039124 | 8/1999 |
| WO | 2000079173 | 12/2000 |
| WO | 2001094798 | 12/2001 |
| WO | 2013056273 | 4/2013 |
| WO | 2014106296 | 7/2014 |

\* cited by examiner

ELECTRICAL CONDUIT FITTING AND ASSEMBLY

TECHNICAL FIELD

The present disclosure relates to conduit systems, and more particularly to an electrical conduit fitting and assembly that facilitates connection to multiple types of metallic conduits.

BACKGROUND

Wiring, cable and other elongated elements require proper protection from weather, sharp objects and other external sources of potential damage. Conduits can be made of metal (e.g., RMC, IMC, EMT), rigid or flexible plastic (e.g., PVC) and other materials, and wiring or cabling can vary from very thin wires that may be bundled for passage through a conduit to very thick cables that may not be joined to any other wires or cabling when passed through a conduit. For purposes of the present disclosure, the term "cable" or "cabling" may be used throughout the present disclosure to refer to any type of wire, cable or similar elongated element that can be inserted and pulled through a conduit.

Rigid metal conduit (RMC) and intermediate metal conduit (IMC) are forms of metal conduit designed to handle indoor, outdoor and underground environments with strong connections which have conventionally been threaded to join the conduit. RMC and IMC are generally formed of steel and may be galvanized depending upon the application. RMC is generally thicker and heavier than IMC, although IMC is generally considered to be nearly as strong as RMC. RMC may be manufactured with inside diameters ranging from 0.5 inches to six inches, whereas IMC may be manufactured with inside diameters ranging from 0.5 inches to four inches. Further, the axial ends of RMC and IMC conduits may be finished and/or formed with a thread or without a thread (i.e., "plain" or "unthreaded"). Applications can include residential and commercial applications, including service masts, panel connections and other outdoor applications.

Electrical metallic tubing (EMT) may sometimes be used instead of galvanized rigid conduit due to its generally thinner walls and lighter weight construction. Generally, EMT does not have a threaded end finish but can be used with threaded fittings that clamp to it. Lengths of EMT may generally be connected to one another via clamp-type fittings or set screw tightened fittings. EMT may be more commonly employed in commercial and industrial buildings than in residential applications. EMT is typically made of coated steel, though it may be aluminum, and is typically employed in dry environments.

Unfortunately, conventional installation and/or attachment of EMT conduit with couplings and fittings generally requires extra tools such as screwdrivers, large pliers and/or pipe wrenches or requires specialized fittings. Regardless of connection type, it is often the case that EMT conduit may not be securely retained in the fitting, which may result in a failed connection affecting the ability to protect and route the internal cabling. Further, a failed connection may result in a failure to maintain conductivity for grounding purposes.

SUMMARY OF DISCLOSURE

The present disclosure provides, in part, an electrical conduit fitting and assembly that facilitates the connection of multiple types of metallic conduit regardless of connection type and finish, particularly in dry environments.

In various embodiments, the device employs a fitting body, a fastening ring and a release pusher. The fastening ring can be provided with staggered teeth or ribbed teeth. The fastening ring is secured within the fitting body to facilitate the push-to-connect installation of a metal conduit into the fitting. In various embodiments, a release pusher is partially secured within the fitting body and a metal conduit to be attached is inserted through the cavities in the release pusher and fastening ring during installation. By employing staggered or ribbed teeth, the fastening ring can accommodate metal conduit such as EMT conduit of slightly different diameter without changing parts. Further, the fitting body interior is formed so as to accommodate inserted conduit members of different diameters and finishes. In various embodiments, a release tool is provided to engage the release pusher to permit the inserted conduit to be disconnected from the fitting body.

DETAILED DESCRIPTION OF EMBODIMENTS

Figure 1:
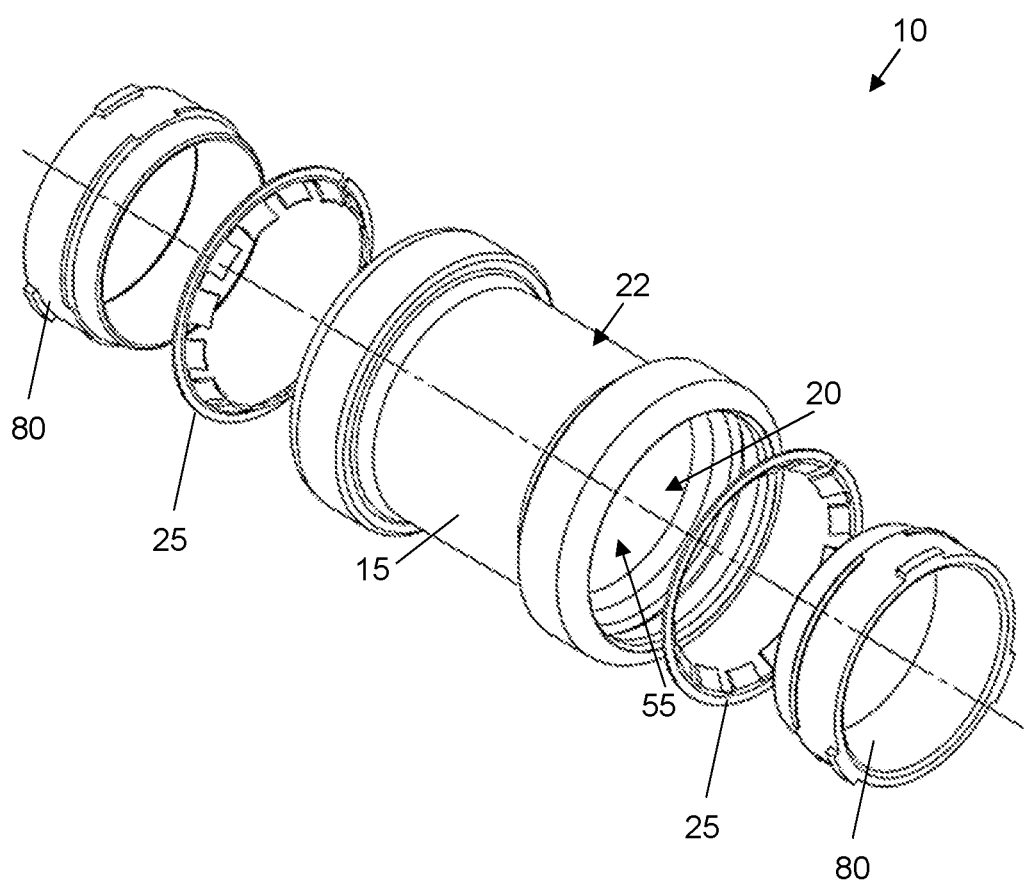
FIG. 1 is an exploded perspective view of an electrical conduit fitting in accordance with embodiments of the present disclosure.

The presently disclosed subject matter now will be described more fully hereinafter with reference to the accompanying drawings, in which some, but not all embodiments of the presently disclosed subject matter are shown. Like numbers refer to like elements throughout.

The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

For purposes of the present disclosure, the term "tube", "pipe", "piping", "conduit", "conduit element" or "piping element" will be understood to encompass one or more pipes, tubes, conduits, piping elements and/or tubing elements, and may be used interchangeably. Further, for purposes of the present disclosure, a fitting can encompass a valve member and other piping elements including, but not limited to: a coupling joint, an elbow joint, a tee joint, a stop end, a ball valve member, tubing and other objects having substantially cylindrical openings. Further, for purposes of the present disclosure, a fitting (also referred to as a body member or main body component) can encompass a valve member and other piping elements including, but not limited to: a coupling joint, an elbow joint, a tee joint, a stop end, a ball valve member, tubing and other objects having cylindrical openings. In various embodiments, the fitting includes an axially inner portion having an interior radius that increases from a tube stop to an axially outer rim of the axially inner portion. In various embodiments, a sealing ring (e.g., O-ring) fits within a first sealing ring compartment defined in the interior surface of the fitting. The fitting interior is formed to provide integrated support for the sealing member and fastening ring when opposing force is applied to piping elements that have been inserted into the fitting. In various embodiments, a release pusher facilitates connection and disconnection of piping elements. Other methods, devices and arrangements associated with the present disclosure are described herein.

It will be appreciated that reference to "a", "an" or other indefinite article in the present disclosure encompasses one or more than one of the described element. Thus, for example, reference to teeth may encompass one or more teeth, reference to a flange may encompass one or more flanges, reference to a notch may encompass one or more notches and so forth.

In the push-to-connect fitting assembly 10 according to embodiments of the present disclosure as shown in FIGS. 1 through 17, elements of the assembly as shown include: a fitting (i.e., fitting body or main body component) 15 having an interior surface 20 and exterior surface 22, a grip or fastening ring 25 and a release pusher 80. In various embodiments, the fitting interior surface 20 is formed via forging and/or machining and is not coined. The fastening ring 25 and release pusher 80, together or a subset thereof, provide embodiments of a packing arrangement 33 disclosed herein, and each has an internal diameter that allows for smooth and snug engagement of an external surface 92 of a piping or tubing element 90 (shown in FIGS. 13 through 17) when inserted into the opening 55 (shown in FIGS. 2 and 3), which is defined by the fitting interior surface 20 and extends axially therethrough along axis 24.

In various embodiments, the interior diameter of the fastening ring 25 (as measured to the teeth 27 and not the ring cylindrical base 26) is slightly less than that of the fitting 15 and the release pusher 80 so as to facilitate proper operation of the presently disclosed device and arrangement. It will be appreciated that the release pusher 80 can be provided as part of the packing arrangement 33 to facilitate the release of tubing, piping and other cylindrical objects (e.g., 90 in FIGS. 13 through 17) inserted into the fitting 15. As discussed elsewhere herein and with reference to FIGS. 13 through 17, when it is desired to release an inserted pipe, for example, from the fitting, the release pusher 80 can be forced in the direction of the fastening ring 25 such that its angular surfaces depress the fastening ring teeth 27 off of the surface 92 of the inserted pipe 90, thereby allowing the pipe to be removed.

Figure 2:
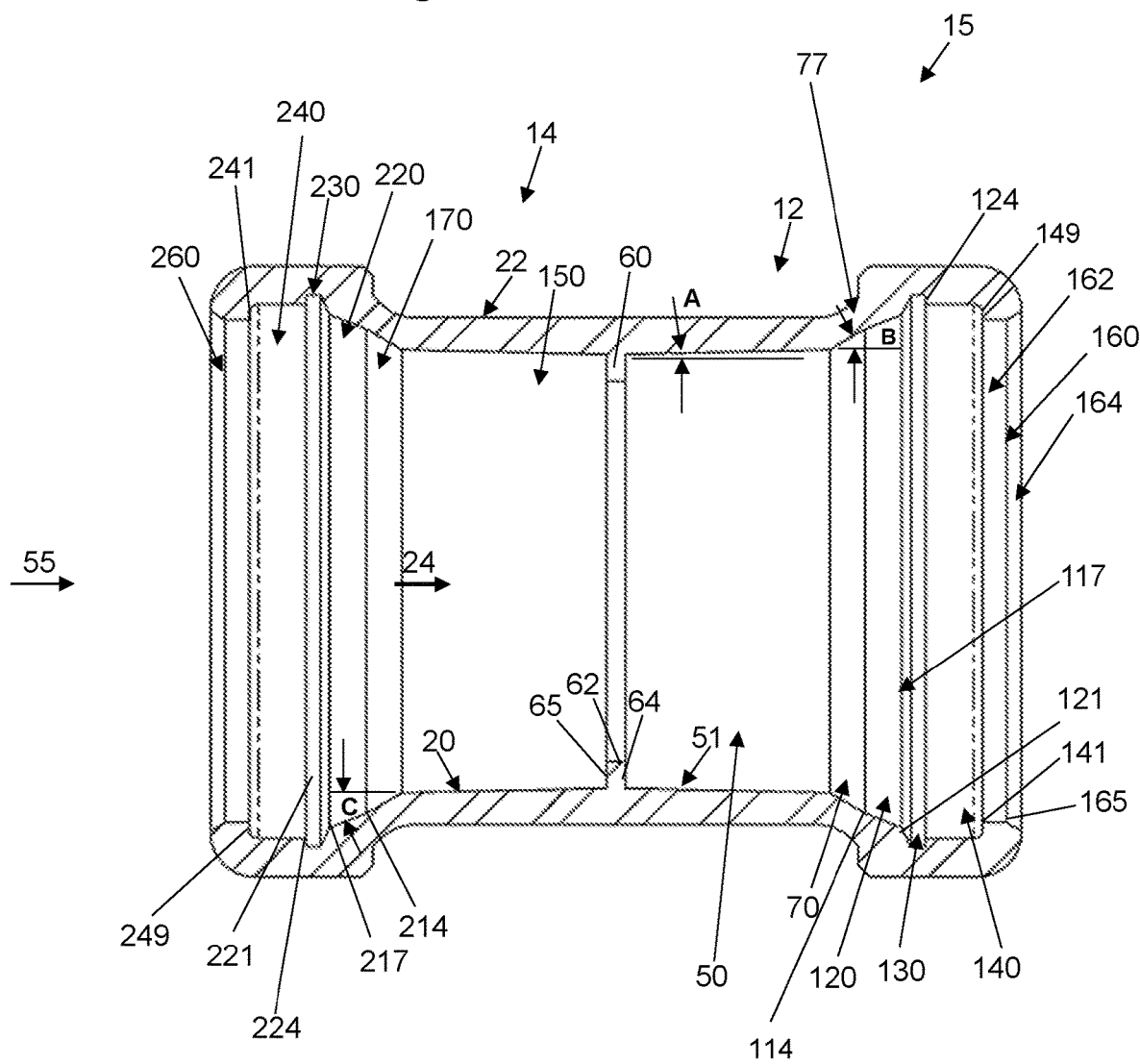
FIG. 2 is a front cross-sectional view of an electrical conduit fitting in accordance with embodiments of the present disclosure.

As further shown in FIGS. 1 through 3 and 17 through 21, the fitting 15 includes first 12 and second 14 segments, divided by a tube stop 60. The fitting 15 can be formed as a monolithic, single body element, wherein the first 12 and second segments 14 and the tube stop 60 are part of the unitary, monolithic, single body 15. The tube stop 60 extends radially inwardly of the inner surface 20 in order to provide a stopping surface for inserted tubes and pipes. In various embodiments, the tube stop 60 comprises a radially innermost and axially extending wall 62, a first segment radially extending wall 64 and a second segment radially extending wall 65. In various embodiments, such as shown in FIG. 2, an axially inner portion 50 of the interior surface 20 of the first segment 12 of the fitting 15 extends axially and radially outwardly from the first segment radially extending wall 64. Further, the axially inner portion 50 can extend axially and radially outwardly from the first segment radially extending wall 64 at a constant angle A to a first axially intermediate portion 70. In various embodiments, angle A can range from approximately 0.01 degrees to approximately fifteen degrees. The higher angle for angle A may be required when the overall length of the fitting may need to be shorter to accommodate a given application. Conversely, angle A may be lower when the length of the fitting is longer. Further, by employing angles within the ranges described, the device ensures adequate contact with the inserted pipe for grounding, as necessary, while also ensuring the ability to maintain a push-connect operation with the fitting packing arrangement and ensuring that the inserted piping element cannot be rotated when fully inserted. Thus, the tapered interior as described herein facilitates several important purposes.

As further shown in FIG. 2, the fitting first segment 12 can include the axially inner portion 50, a first axially intermediate portion 70 extending axially and radially outwardly from the axially inner portion 50 to a support edge 114 and a second axially intermediate portion 120 extending axially and radially outwardly from the support edge 114 to a ridge 117. In various embodiments, the second axially intermediate portion 120 does not extend axially and radially outwardly at the same angle (i.e., angle B in FIG. 2) as the first axially intermediate portion 70, but rather may be formed so as to have a smaller angle (i.e., angle C shown in second segment 14) of radial outward extension than angle B of the first axially intermediate portion 70. It will be appreciated that embodiments of the device disclosed herein can be formed such that the angles A, B and C are different from one another and such that a suitable wall thickness (indicated at 77 in FIG. 2) is maintained so as to avoid or minimize breakage after prolonged use while avoiding tool breakage in the forming of the fitting and while still providing a fitting that permits a push-connect connection of a piping element within the fitting suitable for dry environments. In an exemplary embodiment, angle B is greater than angle A, and such that angle B is greater than angle C. In other embodiments, angles B and C can be the same, wherein both angles B and C are larger than angle A.

With further reference to FIG. 2, the fitting first segment can further include a rampart 121 extending axially and radially outwardly from the ridge 117 and a third axially intermediate portion 130 extending axially outwardly from the rampart 121 to a radially inwardly extending step 124. In various embodiments, the interior surface 20 of the first segment 12 further includes a fourth axially intermediate portion 140 extending axially outwardly from the radially inwardly extending step 124 to a radially inwardly extending support wall 149, wherein the radially extending support wall 149 has a radially innermost lip 141. The interior surface 20 of the first segment 12 further includes an axially outer portion 160 of the first segment 12 extends axially outwardly from the radially inwardly extending lip 141.

It will be appreciated that the second segment 14 of the fitting 15 can be a mirror image of the first segment 12. As such, and as shown in FIG. 2, the fitting second segment 14 can include an axially inner portion 150, a first axially intermediate portion 170 extending axially outwardly from the axially inner portion 170 to a support edge 214, a second axially intermediate portion 220 extending axially and radially outwardly from the support edge 214 to a ridge 217, a rampart 221 extending axially and radially outwardly from the ridge 217 and a third axially intermediate portion 230 extending axially outwardly from the rampart 221 to a radially inwardly extending step 224. In various embodiments, the interior surface 20 of the second segment 14 further includes a fourth axially intermediate portion 240 extending axially outwardly from the radially inwardly extending step 224 to a radially inwardly extending support wall 249, wherein the radially extending support wall 249 has a radially innermost lip 241. The interior surface 20 of the second segment 14 further includes an axially outer portion 260 of the second segment 14 extends axially outwardly from the radially inwardly extending lip 241.

Figure 3:
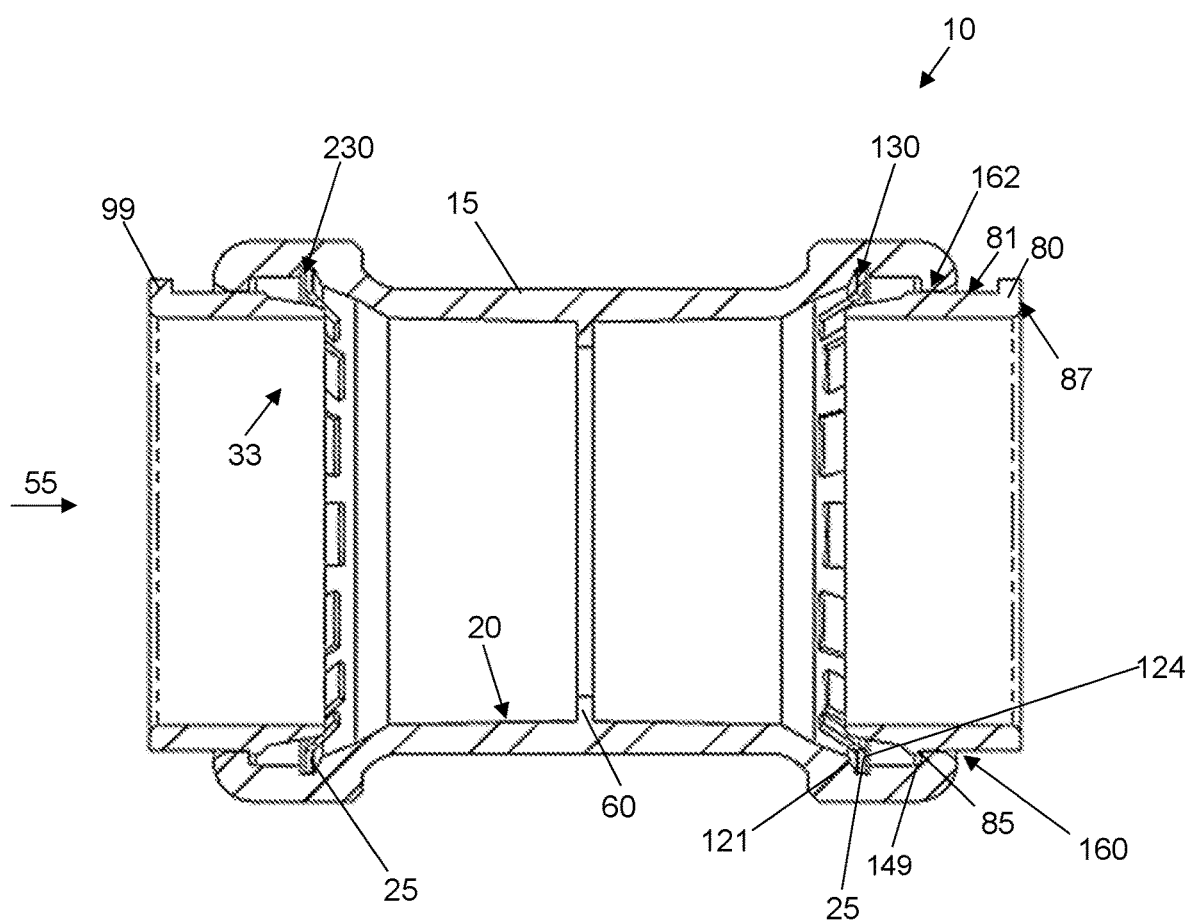
FIG. 3 is a front cross-sectional view of an electrical conduit fitting assembly in accordance with embodiments of the present disclosure.
Figure 4:
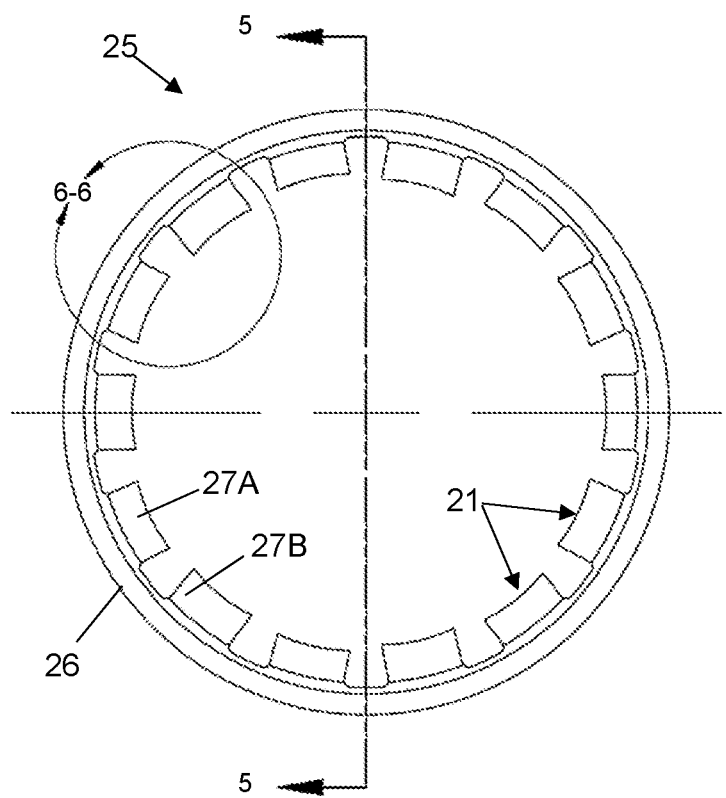
FIG. 4 is a front view of a fastening ring in accordance with embodiments of the present disclosure.
Figure 5:
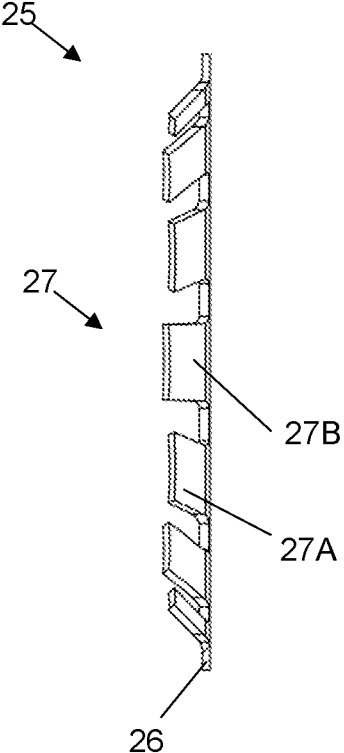
FIG. 5 is a cross-sectional view of the fastening ring taken along line 5-5 of FIG. 4.
Figure 6:
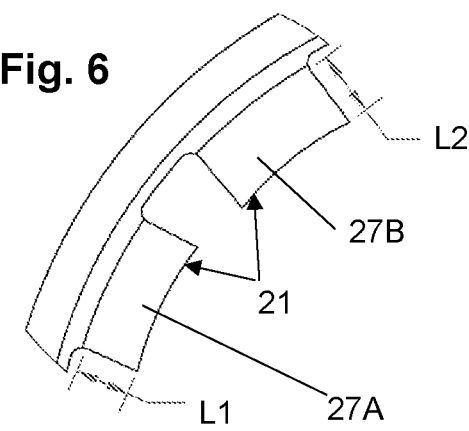
FIG. 6 is an enlarged view of encircled portion 6-6 of FIG. 4.
Figure 7:
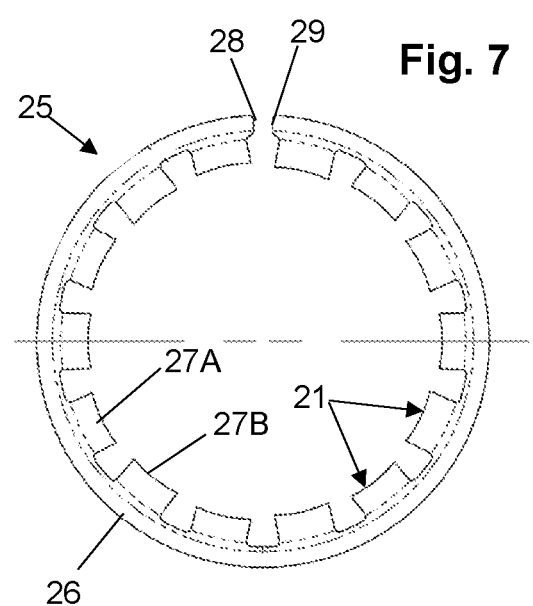
FIG. 7 is a front view of an alternative fastening ring in accordance with embodiments of the present disclosure.
Figure 8:
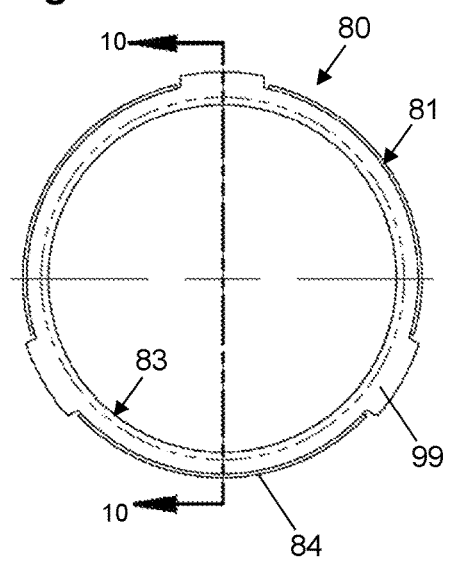
FIG. 8 is a top plan view of a release pusher in accordance with embodiments of the present disclosure.
Figure 9:
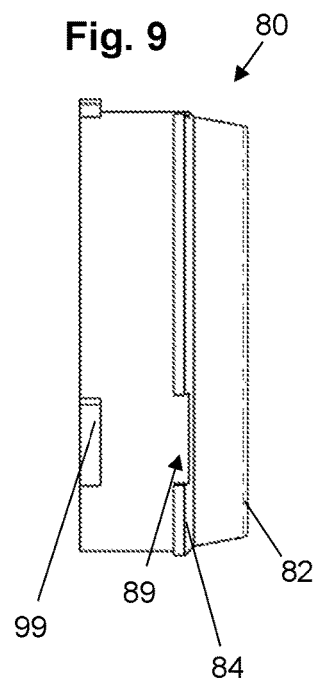
FIG. 9 is a side view of the release pusher of FIG. 8.
Figure 10:
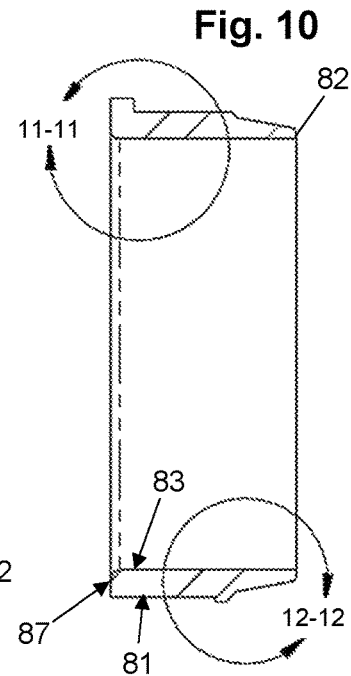
FIG. 10 is a side cross-sectional view of the release pusher taken along the line 10-10 of FIG. 8.
Figure 11:
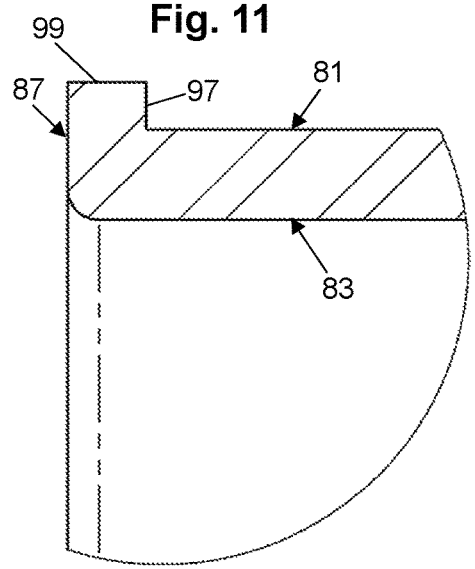
FIG. 11 is an enlarged view of encircled portion 11-11 of FIG. 10.
Figure 12:
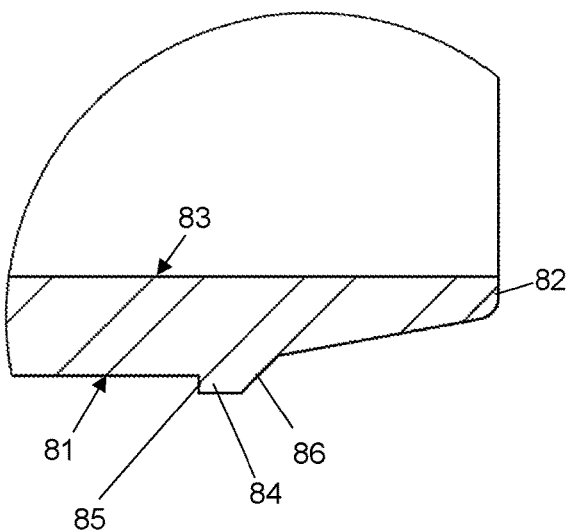
FIG. 12 is an enlarged view of encircled portion 12-12 of FIG. 10.
Figure 13:
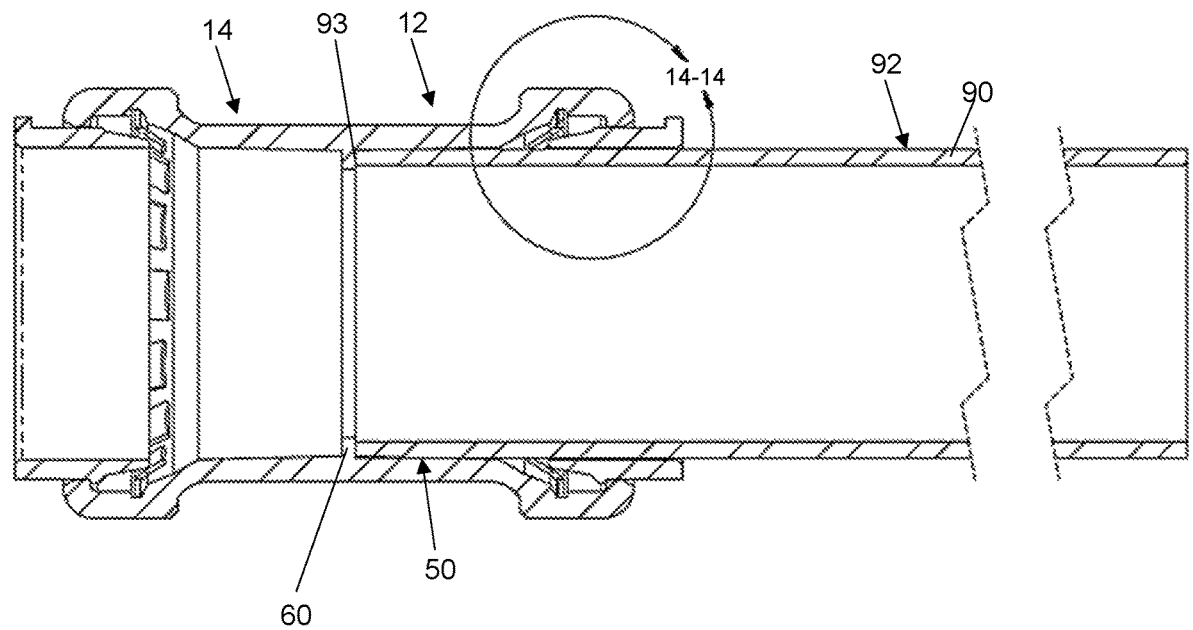
FIG. 13 is a front cross-sectional view of an electrical conduit fitting assembly and showing a conduit inserted in accordance with embodiments of the present disclosure.
Figure 14:
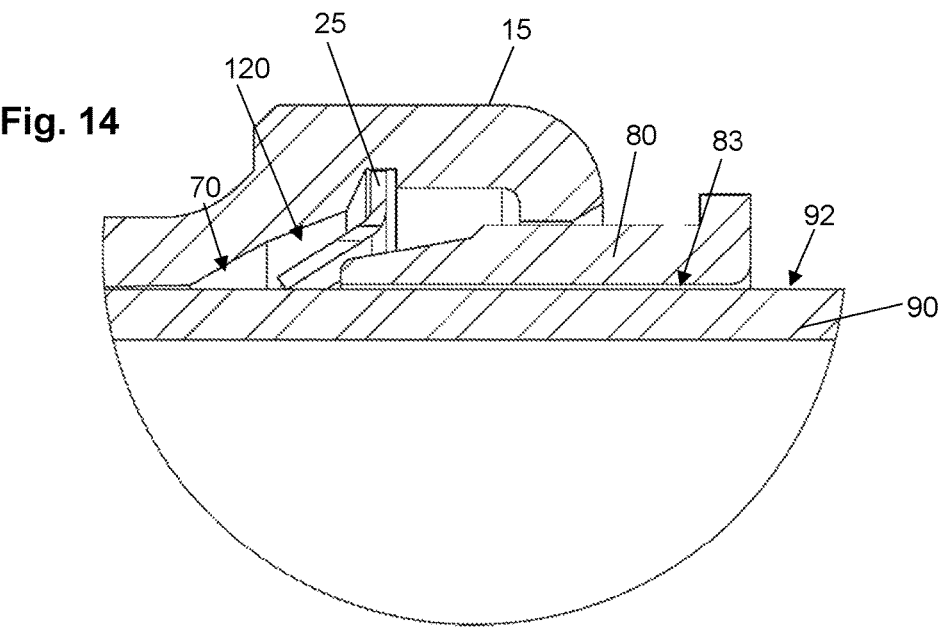
FIG. 14 is an enlarged view of encircled portion 14-14 of FIG. 13.
Figure 15:
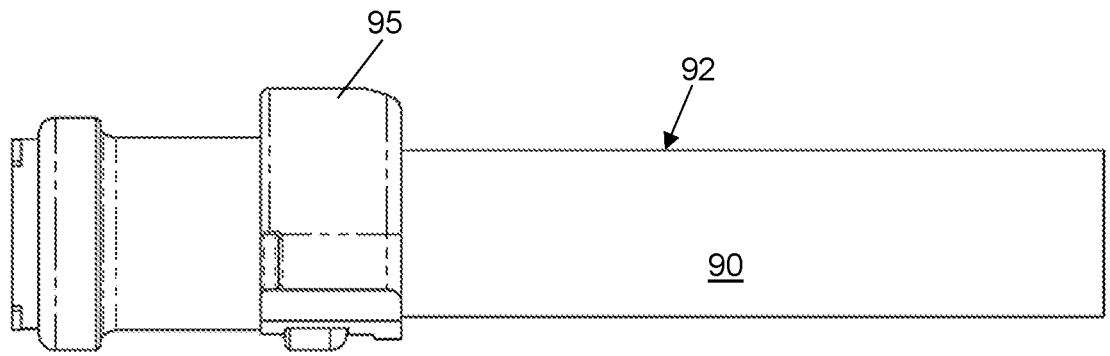
FIG. 15 is a front view of an electrical conduit fitting assembly and further showing a conduit inserted and a release tool applied to the fitting in accordance with embodiments of the present disclosure.
Figure 16:
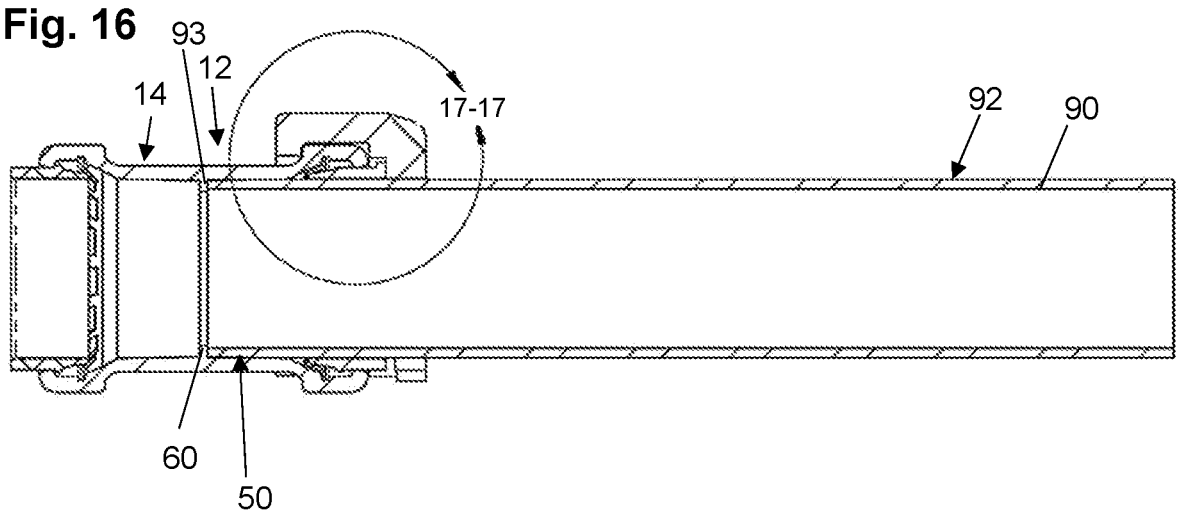
FIG. 16 is a cross-sectional view of the arrangement of FIG. 15.
Figure 17:
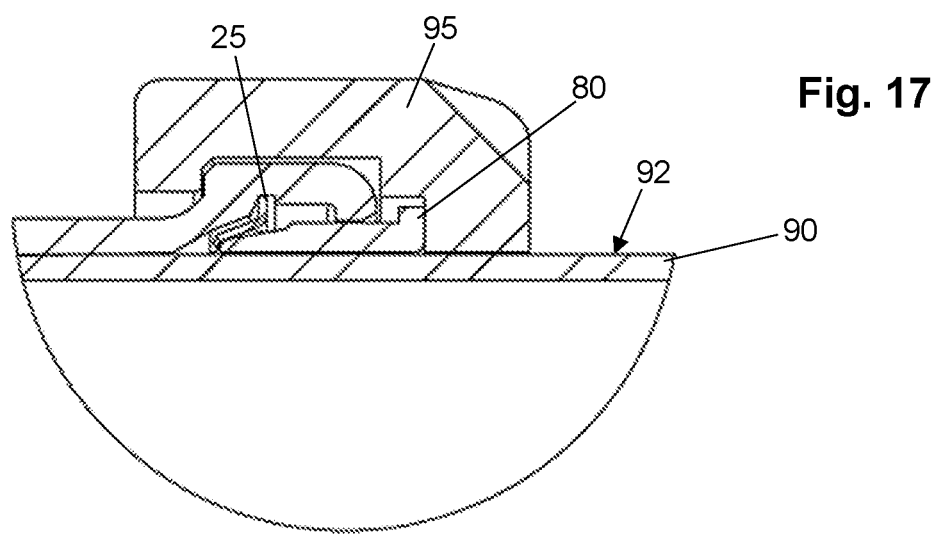
FIG. 17 is an enlarged view of encircled portion 17-17 of FIG. 16.

In various embodiments, and with reference to the first segment 12 of FIG. 2, the axially outer portion 160 includes an axially inward portion 162 and an axially outward portion 164, wherein the axially inward portion 162 extends axially outwardly from the radially inwardly extending lip 241 to an axially outer portion edge 165, and wherein the axially outward portion 164 extends axially and radially outwardly from the axially outer portion edge 165. In this way, the axially outward portion 164 provides a tapered entry area for a tube to be inserted, which allows for modest alignment adjustments during operation without requiring an exact axial alignment in order to insert the tube. While not labeled in FIG. 2, the second segment 14 of the fitting 15 can include a similar arrangement for axially outer portion 260. When installed, the outer surface 81 of the release pusher 80 slidingly engages the axially inward portion 162 of the axially outer portion 160 of the fitting interior surface 20, as shown in FIG. 3.

It will be appreciated that the axially inner portions, axially outer portions and axially intermediate portions can be forged as part of the monolithic, single body of the fitting 15. Further, it will be appreciated that the arrangement of such portions assist with properly maintaining the packing arrangement 33 for optimal operation when tubes are inserted and removed from the fitting 15.

The tapered internal surface 51 of the axially inner portion 70 of the fitting 15 provides an effective stopping surface for inserted tubes and pipes, regardless of diameter (as long as the inserted tube can fit in opening 55. In operation, the pipe or tubing 90 makes continual contact with the internal surface 51 and may be slightly compressed upon reaching the tube stop 60.

As shown in FIGS. 3 through 7 and 13 through 17, a fastening ring 25 is maintained within the third axially intermediate portion (e.g., 130) of the interior surface 20 of one or both segments 12, 14 of the fitting, depending upon the embodiment. The fastening ring 25 can be formed as a unitary, monolithic member with a fastening ring base 26 and teeth 27 extending radially inwardly therefrom. The fastening ring 25 can be provided as an integral, unsplit ring (see FIG. 4) or can be a split ring member (see FIG. 7). In the embodiments where the fastening ring 25 is a split ring, the fastening ring 25 can include two circumferential end points 28, 29 that do not connect, with fixture points (not shown) for handling and compressing the fastening ring, such that a tool designed to hold the fastening ring at the fixture points can more easily handle and compress the fastening ring in order to assist with assembly or disassembly of embodiments disclosed herein. In this embodiment, and once compressed, the fastening ring 25 is easily insertable into the fitting 15 by releasing the hold on the fixture points, thereby allowing the fastening ring to expand such that the circumferential base engages the interior surface 20 within the third axially intermediate portion 130. The fastening ring can be removed from the second radial housing element in similar manner. No wrenches, solder, welding, glue and/or twisting and turning the elements are required to form or disengage a connection.

The fastening ring 25 can comprise a spring steel formulation, for example, that enables the fastening ring to be malformed during installation, while springing back into its originally manufactured position once installed. The fastening ring is capable of grabbing an inserted pipe's surface via two or more teeth 27 to ensure connections cannot be pulled apart. The fastening ring teeth 27 can be angled downwardly from the substantially cylindrical perimeter of the ring base 26, toward the second axially intermediate portion 120 and/or 220, such that when a pipe is inserted, the teeth 27 exert a pressure against the pipe to discourage the pipe from slipping or moving back out of the fitting. Within the fitting, the teeth 27 extend axially and radially inwardly from a position within the third axially intermediate portion 130 and/or 230 to a position within the second axially intermediate portion 120 and/or 220. In various embodiments, during operation, the teeth are flexed axially inwardly and may be supported by the angled second axially intermediate portion 120 and/or 220. In various embodiments, the teeth 27 have a radially inner edge 21 that is curved so as to create more contact surface for an inserted pipe during operation. The greater contact surface translates into more resistance to opposing force when the pipe is inserted and then retained by the teeth 27. In embodiments, the radially inner edge 21 is curved along an arc that is greater than or equal to the curve of the outer surface 92 of the inserted pipe 90.

In embodiments of the fastening ring 25 according to the present disclosure and as shown in FIGS. 6 through 11, the fastening ring 25 may be provided with one or more teeth (e.g., 27A) having a first length L1 from the base 26 and one or more teeth (e.g., 27B) having a second length L2 from the base 26, wherein length L2 is longer than length L1. The staggered length arrangement assists in accommodating inserted pipes of different types, diameters and finishes. For example, a pipe of a narrower diameter may not be as snugly retained by fastening ring teeth 27A having a shorter length but would still be snugly retained by the longer fastening ring teeth 27B. In other words, the fastening ring teeth 27B would provide a greater resisting force to any potential force that might otherwise move an inserted pipe 90 of narrower diameter axially outwardly of the fitting 15 once installed. Another pipe having a wider diameter may be more snugly retained by teeth 27A and may not be as snugly retained by teeth 27B. In other words, the shorter fastening ring teeth 27A would provide a greater resisting force than the longer fastening ring teeth 27B to any potential force that might otherwise move an inserted pipe 90 of wider diameter axially outwardly of the fitting 15 once installed. In various embodiments, the fastening ring teeth 27 are arranged so as to alternate from one length L1 to a longer length L2 in repeated fashion around the internal circumference of the fastening ring 25, as shown in FIGS. 4 through 7. The teeth 27 of the fastening ring 25 can extend at various angles from the base axis as measured when the teeth are at rest position and are not stressed by the insertion of a pipe, for example. The number of teeth can readily vary in number and size.

It will be appreciated that no wrenches, solder, welding, glue, set crews, crimping, clamping and/or twisting and turning the elements are required to form a connection. In various embodiments, the fitting 15 can be forged CW617N brass, with full porting and full flow fitting, for example.

As shown in FIGS. 1, 3 and 8 through 17, for example, embodiments of the present disclosure employ a release pusher 80 axially slidable against the axially outer portion 160 of the fitting interior surface 20. When the release pusher 80 is pushed axially inwardly, the leading edge 82 of the release pusher 80 lifts the teeth 27 of the fastening ring 25 and thereby facilitates the insertion and release of a cylindrical object such as a piping element 90 to be held within the fitting 10. When a piping element is desired to be removed, axially applied pressure can be provided again to the release pusher 80, lifting the fastening ring teeth 27 off of the inserted pipe 90 to allow it to be removed. In embodiments, the release pusher 80 is at least partially maintained within the fitting body 15 and is part of the packing arrangement 33. In various embodiments, the release pusher 80 is formed with an external surface 81, a substantially cylindrical interior surface 83 and a leading edge 82. The release pusher 80 can also be formed with a radially outer ledge segment 84 having a front wall 86 and a ledge back wall 85. The pusher 80 can comprise an injection-molded plastic or a metal material such as brass, for example. When pressure is applied on the back surface 87 of the release pusher 22, the leading edge 82 can engage the inside surface of the fastening ring teeth 27 and the ledge back wall 85 can removably engage the radially extending axially outer edge 149 of fourth axially intermediate portion 140 of the interior surface 20 of the fitting 15, as shown in FIG. 3. As the release pusher 80 is inserted into the opening 55, the radially outer ledge segment 84 engages the fastening ring teeth 27 and pushes them axially inwardly toward the angled second axially intermediate portion 120.

In operation, a tube 90 with a release pusher tool 95 positioned around the circumference of the tube 90 can be inserted into the opening 55 at an axial end of the fitting body 15, and the tool 95 (or alternatively, manual or similar pressure) can be applied to the back surface 87 of the retaining ring 80, thereby forcing the fastening ring teeth 27 radially outwardly such that the tube 25 can be smoothly inserted until it reaches the tube stop 60 of the fitting 15 or a stopping point along the axially inner portion 50 of the fitting interior surface 20 as described elsewhere herein. At such time, the force on the fastening ring 25 can be released, thereby allowing the fastening ring ledge back wall 85 to rest against the radially extending axially outer edge 149 of fourth axially intermediate portion 140 of the interior 20 of the fitting 15, and allowing the fastening ring teeth 27 to engage the outer surface 92 of the tube 90. A similar installation of another tube can take place at the other axial end corresponding to the second segment 14 of the fitting 15.

In installation, the fastening ring 25 is inserted such that its base 26 is securely retained within the third axially intermediate portion 130 of the interior surface 20 of the fitting 15. For example, the fastening ring base 26 can be maintained between the rampart 121 and the radially inwardly extending step 124 as shown in FIG. 3. The release pusher 80 can then be inserted so as to slidingly engage the axially outer portion 160 of the interior surface 20 of the fitting 15 as shown and described elsewhere herein.

In various embodiments, as shown in FIGS. 8 through 12, the release pusher 80 can be effectively snapped on to the end of the fitting due to the outer surface 81 of the release pusher 80 being provided with a radially outer ledge segment 84 as described herein and one or more radially outwardly extending flanges 99. The radially outer ledge segment 84 can be formed with one or more notches 89 formed therein, which creates a modest weakness in the ledge segment 84 permitting easier insertion of the release pusher 80 when installed in the fitting 15. The radially outwardly extending flanges 99 can be formed with an axially inner wall 97 extending radially outwardly from the outer surface 81 of the release pusher 80 near the back surface 87 of the release pusher 80. In various embodiments, the flanges 99 are axially aligned with the notches 89 such that the axial force provided against the flanges 99 combined with the weakness created by the notches 89 permits the release pusher 80 to be more easily installed and removed. In operation, and after installed, the release pusher tool 95 can be used to grip the flanges 99 in order to squeeze and/or pull the release pusher axially outwardly of the fitting 15.

When a piping element 90 is inserted, as shown in FIGS. 13 through 17, the piping element 90 slidingly engages the inner surface 83 of the release pusher 80 as it travels into the pipe receiving cavity 55 of the fitting 15, engaging the fastening ring 25. As the piping element 90 is fully inserted (i.e., when the leading edge 93 of the piping element 90 contacts the tube stop 60), the teeth 27 of the fastening ring 25 engage the outer surface 92 of the inserted piping element 90 in order to retain the piping element 90 securely within the fitting 15. The combination of the fastening ring 25 and the tapered, narrowing internal cavity of the axially inner portion 50 of the fitting 15 prohibit any inclination an inserted pipe may have to slide out of position.

The angles, dimensions and materials described herein will be understood to be exemplary and provided as embodiments associated with proper working operation of the device, assembly and method as presently disclosed. Further, it will be appreciated that, in various embodiments, the members of the push connect joint assembly can be formed through hydroforming processes. Additionally, embodiments can be provided whereby the fitting and/or fitting includes independent packing arrangements on both sides of the tube stop 60, where the packing arrangements each comprise at least one of the following: sealing ring, fastening ring and release pusher, for example.

The device, assembly and method as presently disclosed may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A fitting, comprising:
a fitting body comprising an interior surface and an exterior surface, wherein the interior surface defines a cavity extending along an axis through the fitting body, wherein the fitting body further comprises a first segment separated from a second segment by a radially extending tube stop, wherein the first segment comprises an axially inner portion, an axially outer portion and first, second and third axially intermediate portions, wherein the axially inner portion extends axially and radially outwardly from the tube stop at a first angle, wherein the first axially intermediate portion extends axially and radially outwardly from the axially inner portion at a second angle, and wherein the second axially intermediate portion extends axially and radially outwardly from the first axially intermediate portion at a third angle;
a fastening ring maintained within the second and third axially intermediate portions; and
a release pusher maintained in sliding engagement with the axially outer portion.

2. The fitting of claim 1, wherein the fastening ring comprises fastening ring teeth extending axially and radially inwardly from a position within the third axially intermediate portion to a position within the second axially intermediate portion.

3. The fitting of claim 1, wherein the fastening ring comprises a base with a plurality of sets of teeth extending therefrom, wherein a first of the plurality of sets of teeth extend a first length from the base and a second of the plurality of sets of teeth extend a second length from the base, and further wherein the second length is longer than the first length.

4. The fitting of claim 1, wherein the first axially intermediate portion extends at the second angle to the axially and radially outwardly extending second axially intermediate portion.

5. The fitting of claim 1, wherein the third axially intermediate portion extends axially outwardly of the second axially intermediate portion and comprises a substantially cylindrical portion.

6. The fitting of claim 1, wherein the first angle is smaller than the second and third angles.

7. The fitting of claim 1, wherein the release pusher is formed with a radially external surface, a flange extending radially outwardly from the external surface and an outer ledge segment extending radially outwardly from the external surface, wherein the radially outer ledge segment has a notch formed therein.

8. The fitting of claim 7, wherein the flange is axially aligned with the notch.

9. The fitting assembly of claim 1, wherein the fastening ring is split.

10. The fitting assembly of claim 1, wherein the axially inner portion extends axially and radially outwardly from the tube stop at a constant angle.

11. The fitting of claim 1, wherein the second angle is larger than the third angle, and the third angle is larger than the first angle.

12. A fitting, comprising:
a fitting body comprising an interior surface and an exterior surface, wherein the interior surface defines a cavity extending along an axis through the fitting body, wherein the fitting body further comprises a first segment separated from a second segment by a radially extending tube stop, wherein the first segment comprises an axially inner portion, an axially outer portion and first, second and third axially intermediate portions, wherein the axially inner portion extends axially and radially outwardly from the tube stop at a first angle, wherein the first axially intermediate portion extends axially and radially outwardly from the axially inner portion at a second angle, and wherein the second axially intermediate portion extends axially and radially outwardly from the first axially intermediate portion at a third angle, wherein the axially inner portion extends axially and radially outwardly from the tube stop at a constant angle.

13. The fitting of claim 12, further comprising a fourth axially intermediate portion extending axially outwardly from a radially inwardly extending step to a radially inwardly extending lip.

14. The fitting of claim 13, wherein the axially outer portion of the first segment extends axially outwardly from the radially inwardly extending lip.

15. The fitting of claim 13, wherein the axially outer portion of the first segment comprises an axially inward portion and an axially outward portion, wherein the axially inward portion extends axially outwardly from the radially inwardly extending lip to an axially outer portion edge, and wherein the axially outward portion extends axially and radially outwardly from the axially outer portion edge.

16. The fitting of claim 12, wherein the first, second and third angles are different from one another.

17. The fitting of claim 12, wherein the tube stop comprises a radially innermost and axially extending wall, a first segment radially extending wall and a second segment radially extending wall, wherein the axially inner portion of the first segment extends axially and radially outwardly from a first segment edge at the first angle and wherein the axially inner portion of the second segment extends axially and radially outwardly from a second segment edge at a second segment angle which is the same as the first angle, and wherein the first angle and the second segment angle are constant.

18. The fitting of claim 17, wherein the second segment comprises an axially inner portion, an axially outer portion and first, second and third axially intermediate portions, wherein the axially inner portion of the second segment extends axially and radially outwardly from the tube stop, wherein the first axially intermediate portion of the second segment extends axially and radially outwardly from the axially inner portion of the second segment, and wherein the second axially intermediate portion of the second segment extends axially and radially outwardly from the first axially intermediate portion of the second segment.

19. A fitting, comprising:
a fitting body comprising an interior surface and an exterior surface, wherein the interior surface defines a cavity extending along an axis through the fitting body, wherein the fitting body further comprises a first segment separated from a second segment by a radially extending tube stop, wherein the first segment comprises an axially inner portion, an axially outer portion and first, second and third axially intermediate portions, wherein the axially inner portion extends axially and radially outwardly from the tube stop at a first angle, wherein the first axially intermediate portion extends axially and radially outwardly from the axially inner portion at a second angle, and wherein the second axially intermediate portion extends axially and radially outwardly from the first axially intermediate portion at a third angle, wherein the first angle is smaller than the second and third angles.

\* \* \* \* \*